(12) United States Patent
Binkert et al.

(10) Patent No.: US 8,687,975 B2
(45) Date of Patent: Apr. 1, 2014

(54) INTEGRATED CIRCUIT WITH OPTICAL INTERCONNECT

(75) Inventors: Nathan Lorenzo Binkert, Redwood City, CA (US); Robert Samuel Schreiber, Palo Alto, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 12/933,863

(22) PCT Filed: Oct. 23, 2008

(86) PCT No.: PCT/US2008/012096
§ 371 (c)(1),
(2), (4) Date: Mar. 8, 2011

(87) PCT Pub. No.: WO2009/055016
PCT Pub. Date: Apr. 30, 2009

(65) Prior Publication Data
US 2011/0280569 A1    Nov. 17, 2011

Related U.S. Application Data

(60) Provisional application No. 61/000,191, filed on Oct. 23, 2007.

(51) Int. Cl.
*H04B 10/80* (2013.01)
*H04J 14/02* (2006.01)
*H01L 27/14* (2006.01)

(52) U.S. Cl.
USPC .................. 398/164; 398/79; 385/14; 438/69

(58) Field of Classification Search
USPC .......................... 398/79, 164; 385/14; 438/69
See application file for complete search history.

(56) References Cited

U.S. PATENT DOCUMENTS

| | | | |
|---|---|---|---|
| 5,394,489 A * | 2/1995 | Koch | 385/14 |
| 6,845,184 B1 * | 1/2005 | Yoshimura et al. | 385/14 |
| 7,356,213 B1 * | 4/2008 | Cunningham et al. | 385/14 |
| 7,554,195 B2 * | 6/2009 | Zingher et al. | 257/724 |
| 7,693,424 B1 * | 4/2010 | Krishnamoorthy et al. | 398/135 |
| 7,889,996 B2 * | 2/2011 | Zheng et al. | 398/164 |
| 2003/0067851 A1 * | 4/2003 | Ishibashi et al. | 369/44.34 |
| 2005/0078902 A1 | 4/2005 | Beausoleil | |
| 2005/0276604 A1 * | 12/2005 | Morrow et al. | 398/73 |
| 2006/0047871 A1 | 3/2006 | Beeken et al. | |
| 2006/0159387 A1 * | 7/2006 | Handelman | 385/14 |
| 2011/0069963 A1 * | 3/2011 | McLaren et al. | 398/115 |
| 2012/0230695 A1 * | 9/2012 | O'Krafka et al. | 398/87 |

OTHER PUBLICATIONS

Beausoleil et al. "A Nanophotonic Interconnect for High-Performance Many-Core Computation". HP Laboratories, Mar. 21, 2008, retrieved from the internet <URL: http://www.hpl.hp.com/personal/Robert_Schreiber/papers/2008%20LEOS%20Newsletter/rgb_leos_interconnects.pdf.

(Continued)

*Primary Examiner* — Nathan Curs

(57) ABSTRACT

The present invention provides one or more embodiments of an optical interconnect design suitable for providing communication between computer system components in a computer system device. The optical interconnect can be integrated on a chip, and can be used to implement complex chips with a large number of cooperating components.

15 Claims, 4 Drawing Sheets

(56) References Cited

OTHER PUBLICATIONS

Hewlett-Packard Development Company, L.P.. International Search Report and Written Opinion, Korean Intellectual Property Office, May 19, 2009.

Kirman et al. "Leveraging optical technoiogy in future bus-based chip multiprocessors". 39th IEEE/ACM International Symposium on Microarchitecture, pp. 492-503, 2006, Retrieved from internet on Jul. 27, 2011 <URL: http://m3.csl.cornell.edu/papers/micro06.pdf >.

\* cited by examiner

INTEGRATED CIRCUIT WITH OPTICAL INTERCONNECT

CROSS-REFERENCE TO RELATED APPLICATION

This application is a U.S. National Stage Application of International Patent Application No. PCT/US2008/012096, filed on Oct. 23, 2008, which claims priority to U.S. Provisional Patent Application No. 61/000,191, filed on Oct. 23, 2007, each entitled "INTEGRATED CIRCUIT WITH OPTICAL INTERCONNECT".

TECHNICAL FIELD

The present invention relates generally to an optical interconnect suitable for use in an integrated circuit for a computer system device.

BACKGROUND ART

Modern consumer electronics, such as game consoles, notebook computers, smart phones, personal digital assistants, and location based services devices, as well as enterprise class electronics, such as servers, storage arrays, and routers, are packing more integrated circuits into an ever-shrinking physical space with expectations for decreasing cost and increasing performance. Contemporary electronics expose integrated circuits to more demanding environmental conditions, such as cold, heat, and humidity requiring the overall system to provide robust thermal management solutions. Higher performance, more functions, lower power usage, and longer usage of battery power are yet other expectations placed upon contemporary electronics.

As more functions are packed into integrated circuits and more integrated circuits into a package, more heat is generated degrading the performance, the reliability, and the lifetime of the integrated circuits as well as the overall system. Numerous technologies have been developed to meet these new requirements. Some of the research and development strategies focus on the integrated circuit technologies and associated integrated circuit packaging. Others focus on other forms of thermal management solutions, such as heat sinks/slug, heat spreaders, or localized fans directly over the integrated circuit. Yet other solutions may use a combination of solutions.

As a more specific example, recent industrial nanoscale research and development has shown promise for reducing the size of memory and logic circuits in information technology applications. In particular, the multi-core CPU era has arrived. As transistor density increases, the number of transistors comprising a single computer core will not change significantly, but the number of cores packaged on the die will now grow exponentially.

Unfortunately, computer performance is already lagging expectations based on Moore's Law due to limitations of the interconnects used to communicate between these cores. However, the communication bandwidth of current and future multi-core systems scale only linearly due to the thermal physics of metal wires used in convention integrated circuits, such as processors (CPU).

As a result, computer architecture is now in crisis, because parallel programming models are severely limited by poor memory and interconnect performance. Computer performance no longer doubles every eighteen months, and there is no reason to believe that this exponential scaling will ever occur again unless dramatic changes to multi-core architectures are enabled by new interconnect technologies.

The critical problems facing general purpose computer design, for example, are heat generation and communication bandwidth. Architectural compromises made to cope with both of these problems make programming difficult and impair application performance.

Thus, a need still remains for an integrated circuit providing high speed interconnects and low power. In view of the ever-increasing need to save costs and improve efficiencies, it is more and more critical that answers be found to these problems.

SUMMARY

The present invention provides one or more embodiments of an optical interconnect design suitable for providing communication between computer system components in a computer system device. The optical interconnect can be integrated on a chip, and can be used to implement complex chips with a large number of cooperating components.

Certain embodiments of the invention have other aspects in addition to or in place of those mentioned or obvious from the above. The aspects will become apparent to those skilled in the art from a reading of the following detailed description when taken with reference to the accompanying drawings.

DETAILED DESCRIPTION

Figure 1:
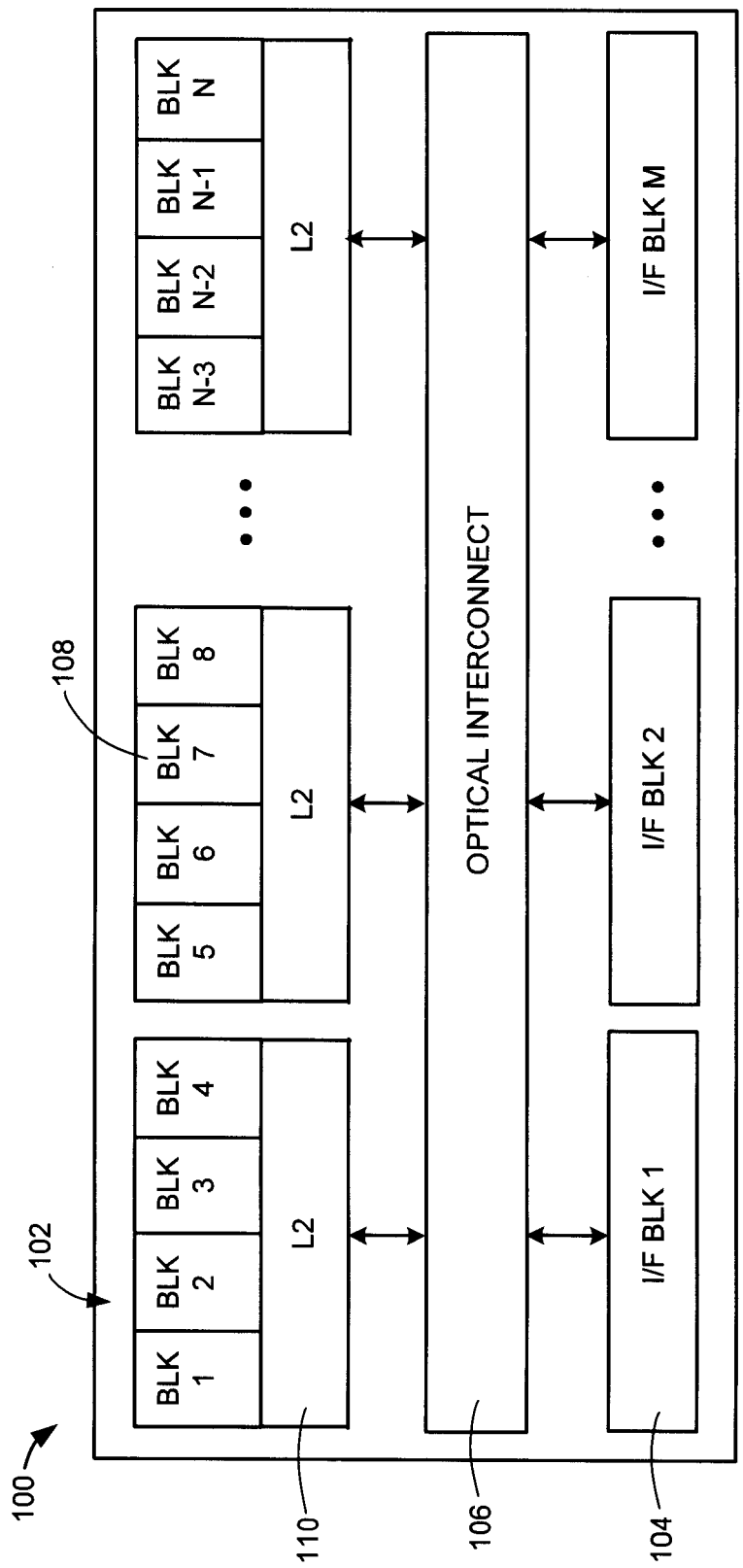
FIG. 1 is a block diagram view of an integrated circuit in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals. The embodiments have been numbered first embodiment, second embodiment, etc. as a matter of descriptive convenience and are not intended to have any other significance or provide limitations for the present invention.

Referring now to FIG. 1, therein is shown a block diagram view of an integrated circuit 100 in an embodiment of the present invention. The block diagram exemplifies the integrated circuit 100 as a processor integrated circuit, such as a central processing unit (CPU), having both clusters 102 and interface blocks 104 coupled with an optical interconnect 106. It is understood that the present invention may be practiced with the integrated circuit 100 having different numbers of blocks, different types of blocks, different types of the optical interconnects, or a combination thereof.

The integrated circuit 100 preferably has the optical interconnect 106 providing communication paths between the clusters 102 and the interface blocks 104. The clusters 102 may preferably interact with each other with the optical interconnect 106. The interface blocks 104 may also preferably interact with each other with the optical interconnect 106. Each of the interface blocks 104 preferably includes level three caches, memory controllers, or input/output interfaces.

Each of the clusters 102 preferably includes blocks 108, such as processor cores, memory cores, memory banks, other functional blocks, or port circuitry, with each of the blocks 108 having a level one (L1) cache (not shown). Each of the clusters 102 preferably includes a level two cache 110 (L2). The level two cache 110 preferably serves as a next level cache in a system memory hierarchy for the blocks 108 to access.

For example, the blocks 108 in the clusters 102 may access code or data from the L1 cache within each of the blocks 108. The L1 cache provides the highest speed access for the processors in the blocks 108. As code or data are not available in the L1 cache, a cache miss may cause the blocks 108 to interact with the next level cache of the system memory hierarchy and access the level two cache 110.

Similarly, the data, code, or other information in the L1 cache may be updated for other reasons than a cache miss. As an example, a predetermined cache update algorithm, such as least recently used (LRU), sequential read ahead, or predictive branching, may also update the L1 cache. For illustrative purposes, the blocks 108 are described with the L1 cache updated with the level two cache 110, although it is understood that the blocks 108 may have the L1 cache updated from a different cache level of the system memory hierarchy.

The clusters 102 may preferably interact with the interface blocks 104 through the optical interconnect 106 for moving information between the blocks 108 and the level two cache 110 of each of the clusters 102 and external memory. For example, an external memory, such as read only memory (ROM), dynamic random access memory (DRAM), or static random access memory (SRAM), preferably provides the next level cache in the system memory hierarchy to the level two cache 110.

As technology evolves, it is desirable for processor chips, such as the integrated circuit 100, using many power-efficient blocks, such as the blocks 108, and caches, including the L1 cache and the level two cache 110, to achieve the best possible performance per unit energy. These requirements drive the development of the integrated circuit 100 in the direction of efficient, dual-issue, multithreaded, low-power blocks.

The blocks 108 and the memory system are preferably connected using photonics with the optical interconnect 106. The optical interconnect 106 offers enormous bandwidth, reduced latency, and very low power compared to electrical interconnects (not shown).

The optical interconnect 106 preferably provides a crossbar or a cross-point functionality between the clusters 102 and the interface blocks 104 providing a symmetric architecture for the integrated circuit 100 with the memory system. The symmetric architecture enables the different cache levels of the system memory hierarchy to have similar or nearly equal access time by the blocks 108, thereby reducing the complexity of parallel program development.

Furthermore, the integrated circuit 100 with the optical interconnect 106 preferably provides scalable bandwidth of two bytes per flop to the external memory eliminating the need to exploit complex software techniques, such as multi-level tiling, to improve performance. The improved bandwidth to the external memory and the increased capacity with the external memory mitigate or eliminate the need for a separate level three cache (L3) (not shown) whereby the system memory hierarchy may progress from the level two cache to the external memory serving as the main memory. The elimination of the L3 cache saves power and cost while also reducing latency and hardware complexity.

The blocks 108 in each of the clusters 102 may be implemented in different ways. For example, the blocks 108 may be organized and attached in a bit-sliced configuration. Another example, each of the blocks 108 may be implemented as data path tiles such that the tiles may be abutted next to and connected to each other. Each of the blocks 108 may be an isolated processing unit or may function collaboratively with others in each of the clusters 102.

For illustrative purposes, the block diagram of the integrated circuit 100 depicts various functional blocks, although it is understood that the block diagram may not depict all the functional blocks of the integrated circuit 100. For example, the input/output cells whether electrical, optical, or a combination thereof, are not shown.

Figure 2:
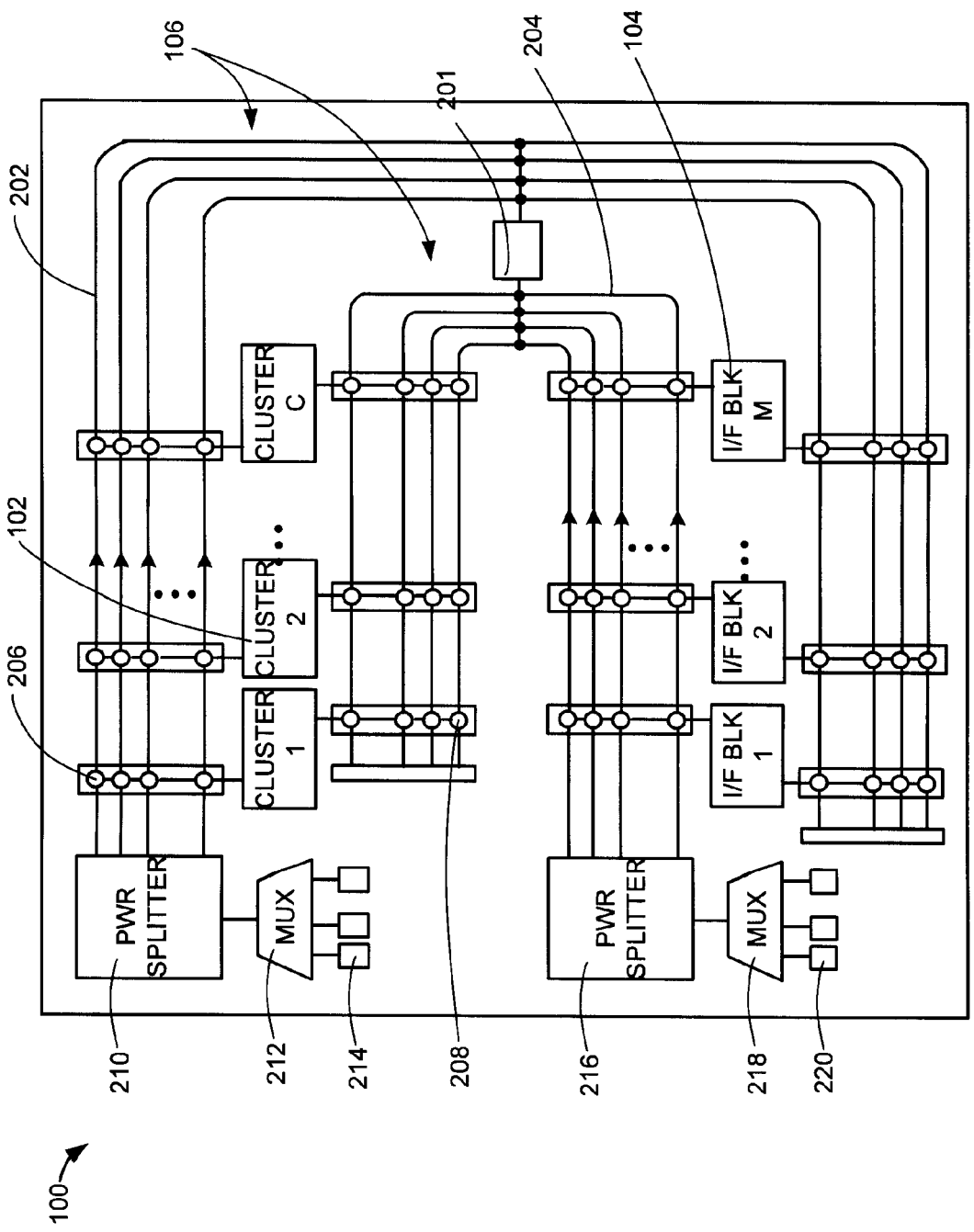
FIG. 2 is a schematic view of a portion of the integrated circuit of FIG. 1.

Referring now to FIG. 2, therein is shown a schematic view of a portion of the integrated circuit 100 of FIG. 1. The schematic view depicts the integrated circuit 100 preferably having the optical interconnect 106 with first optical channels 202 and second optical channels 204. The first optical channels 202, such as optical waveguides, preferably provide communication paths from the clusters 102 to the interface blocks 104. The second optical channels 204, such as optical waveguides, preferably provide communication paths from the interface blocks 104 to the clusters 102. The optical interconnect 106 provides full-duplex communication paths between the clusters 102 and the interface blocks 104 with the first optical channels 202 cooperating with the second optical channels 204.

The optical interconnect 106 preferably functions as a crossbar for the wavelength division multiplexed (WDM) or dense wavelength division multiplexed (DWDM) light on parallel waveguides, such as the first optical channels 202 and the second optical channels 204. As a more specific example, the first optical channels 202 and the second optical channels 204 connect the blocks 108 of FIG. 1 sharing the level two cache 110 of FIG. 1 in each of the clusters 102 and the interface blocks 104, such as memory controllers, and vice versa.

Each of the interface blocks 104 preferably monitors or "listens" to the first optical channels 202 for a specific communication channel or wavelength. Similarly, each of the clusters 102 monitors or "listens" to the second optical channels 204 for a specific communication channel or wavelength.

Each of the interface blocks 104 and each of the clusters 102 may preferably modulate a wavelength in the optical interconnect 106 to send to a predetermined destination. For example, the interface blocks 104 may modulate a wavelength from the first optical channels 202 to send to a predetermined selection of the clusters 102 over the second optical channels 204. Similarly, as an example, the clusters 102 may modulate a wavelength from the second optical channels 204 to send to a predetermined selection of the interface blocks 104 over the first optical channels 202.

The integrated circuit 100 preferably includes an arbitration scheme and tunable wavelength modulators 206 for allocating channels to senders, such as the clusters 102 or the interface blocks 104, in the presence of potential conflicts at the destination, such as the clusters 102 or the interface blocks 104. The arbitration scheme aides in preventing conflicts over the optical interconnect 106 or more specifically over the first optical channels 202 and the second optical channels 204. For illustrative purposes, the arbitration scheme is described preventing conflicts within the integrated circuit 100, although it is understood that the arbitration scheme may prevent conflicts with the integrated circuit 100 and external to the integrated circuit 100.

The arbitration scheme may be performed by a number of different circuits. For example, arbitration blocks 201 may be coupled to the optical interconnect 106. As another example, the arbitration blocks 201 may be included in one or more of the blocks, such as the clusters 102 or the interface blocks 104, coupled to the optical interconnect 106.

As a more specific example, the backbone for providing the optical crossbar functionality with the optical interconnect 106 is the "2k" parallel ridge or photonic waveguides. The optical interconnect 106 includes "k" channels of the first optical channels 202 and "k" channels of the second optical channels 204. The first optical channels 202 or half of the channels in the optical interconnect 106 carry information "downstream" from the clusters 102 to the interface blocks 104, such as the memory controllers. The second optical channels 204 or the other half of the channels in the optical interconnect 106 transmit information "upstream" from the interface blocks 104 to the clusters 102.

The value of "k" may be determined by the system cache line and independent of the number of the blocks 108 or the clusters 102, the number of the interface blocks 104, and the number of caches, such as the L1 cache and the level two cache 110. This independence allows the architecture of the integrated circuit 100 to be scalable.

Continuing with the specific example, WDM or DWDM is carried over the first optical channels 202 and the second optical channels 204. The number of "downstream" wavelengths or number of wavelengths over the first optical channels 202 is preferably determined by the number of the interface blocks 104, "M". The number of "upstream" wavelengths or the number of wavelengths over the second optical channels 204 is preferably determined by the number of the clusters 102, "C".

Each of the clusters 102 drives "k" number of the tunable wavelength modulators 206, one for each of the first optical channels 202 for transmission over the first optical channels 202. The tunable wavelength modulators 206 may be designed in a number of ways, such as a Mach-Zehnder interferometer, a ring modulator and filter, a resonance-assisted modulator, a frequency agile modulator, a resonant cavity design, or a combination thereof. Each of the clusters 102 monitors "k" number of fixed channel photodetectors 208, each distinct, for reception over the second optical channels 204. The fixed channel photodetectors 208 may be designed in a number of ways, such as a receiverless resonant photodetector.

Similarly, each of the interface blocks 104 drives "k" number of the tunable wavelength modulators 206, one for each of the second optical channels 204 for transmission over the second optical channels 204. Each of the interface blocks 104 monitors "k" number of the fixed channel photodetectors 208, each distinct, for reception over the second optical channels 204.

For example, one of the clusters 102, designated as "c", preferably communicates with one of the interface blocks 104, designated as "m". Each of the "k" number of the tunable wavelength modulators 206 under the control of "c" is preferably tuned to a predetermined wavelength $\lambda_m$. As "c" operates with $\lambda_m$, the clusters 102 other than "c" may not transmit at $\lambda_m$. One of the interface blocks 104, designated as "m", may interact with $\lambda_m$ from "c", wherein the interaction includes detecting $\lambda_m$ and performing tasks or operations with $\lambda_m$. The interface blocks 104 other than "m" do not interact with $\lambda_m$ from "c", wherein the non-interaction includes not performing tasks or operations with $\lambda_m$ and may or may not include detecting $\lambda_m$ as not the designated wavelength.

Further, as an example, each of the tunable wavelength modulators 206 may be implemented by a bank of fixed-wavelength modulators and one may be selected for use with the arbiter granting the right to modulate a particular wavelength of light. Messages to a given destination, such as the clusters 102 or the interface blocks 104, are preferably carried on all waveguides of the optical interconnect 106 over a destination-specific subset of wavelengths. Senders, such as the clusters 102 or the interface blocks 104, preferably have one of the tunable wavelength modulators 206 or select from a bank of fixed-wavelength modulators therein per waveguide of the optical interconnect 106. The receivers, such as the interface blocks 104 or the clusters 102, preferably have a fixed-wavelength receiver per waveguide of the optical interconnect 106.

Yet another example, the integrated circuit 100 may use multiple waveguides or a small subset of the waveguides of the optical interconnect 106 rather than the wavelengths preferably dedicated to each destination, such as the clusters 102 or the interface blocks 104. For example, the integrated circuit 100 may have with four blocks connected to the optical interconnect 106 and the optical interconnect 106 includes eight waveguides, wherein the blocks preferably represents the clusters 102, the interface blocks 104, or a combination thereof.

Continuing with the example, waveguides 0 and 1 preferably carry messages to a block 0, waveguides 2 and 3 for messages to a block 1, waveguides 4 and 5 for messages to a block 2, etc. There would preferably be a number, "W", of wavelengths of light present in and modulated on each waveguide. These would be used to carry "W" bits in parallel. If block 0 is sending to block 2, for example, block 0 preferably modulates, with a bank of "W" modulators of the tunable wavelength modulators 206, "W" wavelengths on both waveguides 4 and 5, thereby sending "2W" bits on each clock of the optical channel. Each of the blocks will now need a bank of "W" receivers, such as a bank of the fixed channel photodetectors 208 with each preferably different from one another in the bank, on each of the waveguides used to communicate messages to them.

Further continuing with the example, messages to a given destination, such as the clusters 102 or the interface blocks 104, are preferably carried on a destination-specific subset of waveguides with "W" wavelengths. Senders, such as the clusters 102 or the interface blocks 104, preferably have a bank of fixed-wavelength modulators for the tunable wavelength modulators 206 and select a subset of waveguides, after the arbiter grants them access, on which to modulate. The receivers, such as the interface blocks 104 or the clusters 102, preferably have a bank of fixed-wavelength receivers on only their specific subset of waveguides.

The integrated circuit 100 may include other combinations of the optical interconnect 106, the tunable wavelength modulators 206, and the fixed channel detectors 208 for a communication means, protocol, or type between the clusters 102 and the interface blocks 104. For example, the integrated circuit 100 may have a wavelength or a subset of wavelengths per sender with banks of photodetectors per receiver. Another example, the integrated circuit 100 may have a waveguide or a subset of waveguides per sender with banks of photodectors per receiver.

The optical interconnect 106 preferably provides the crossbar functionality without relying on either broadcasting or switching. This allows the optical interconnect 106 to be linearly scaled in the number of nanophotonic components, such as the tunable wavelength modulators 206, based on the number of communication destinations and hence the number of wavelengths over the first optical channels 202 and the number of wavelengths over the second optical channels 204.

The optical interconnect 106 preferably operates synchronously with each of the tunable wavelength modulators 206 operating at preferably twice the system clock frequency allowing two bits per clock to be transmitted by each of the clusters 102 along the first optical channels 202. Similarly, the tunable wavelength modulators 206 for the interface blocks 104 also operate twice the system clock frequency along the second optical channels 204. The synchronous operation of the optical interconnect 106 with the clusters 102 and the interface blocks 104 allows die size savings and power consumption reduction by eliminating serialization and deserialization (SerDes).

The first optical channels 202 are preferably driven by the outputs of a first power splitter 210. The first power splitter 210 receives input from a first power combiner 212. First lasers 214 provide optical output with wavelengths from $\lambda_1$ through $\lambda_B$ to the input of the first power combiner 212. The first lasers 214 may be included in the integrated circuit 100 or external to the integrated circuit 100.

The second optical channels 204 are preferably driven by the outputs of a second power splitter 216. The second power splitter 216 receives input from a second power combiner 218. Second lasers 220 provide optical output with wavelengths from $\lambda_1$ through $\lambda_C$ to the input of the second power combiner 218. The second lasers 220 may be included in the integrated circuit 100 or external to the integrated circuit 100.

For illustrative purposes, the integrated circuit 100 is shown with the clusters 102 interacting with the interface blocks 104 through the optical interconnect 106, although it is understood that the integrated circuit 100 may have other interconnects (not shown) or other blocks (not shown) not coupled to the optical interconnect 106. For example, the integrated circuit 100 may have other optical interconnects (not shown) not coupled to the optical interconnect 106 or may have electrical interconnects.

Also for illustrative purposes, the optical interconnect 106 is described with an equal number of the first optical channels 202 for the "downstream" communication and the second optical channels 204 for the "upstream" communication, although it is understood that the number of the first optical channels 202 and the number of the second optical channels 204 may be different. For example, the optical interconnect 106 may have different "downstream" and "upstream" channels for providing redundant paths to different locations for one direction and the other or different number of redundant paths between the two directions. Different numbers of channels may also be provided to support different read vs. write bandwidth or other purposes.

Further for illustrative purposes, the optical interconnect 106 provides bi-directional communication between the clusters 102 and the interface blocks 104, although it is understood that the optical interconnect 106 may provide a single direction communication from other blocks (not shown) to the clusters 102 and the interface blocks 104. For example, clock generation blocks (not shown) or a reset blocks (not shown) may provide clock or reset from its respective blocks to the other blocks through the optical interconnect 106.

Figure 3:
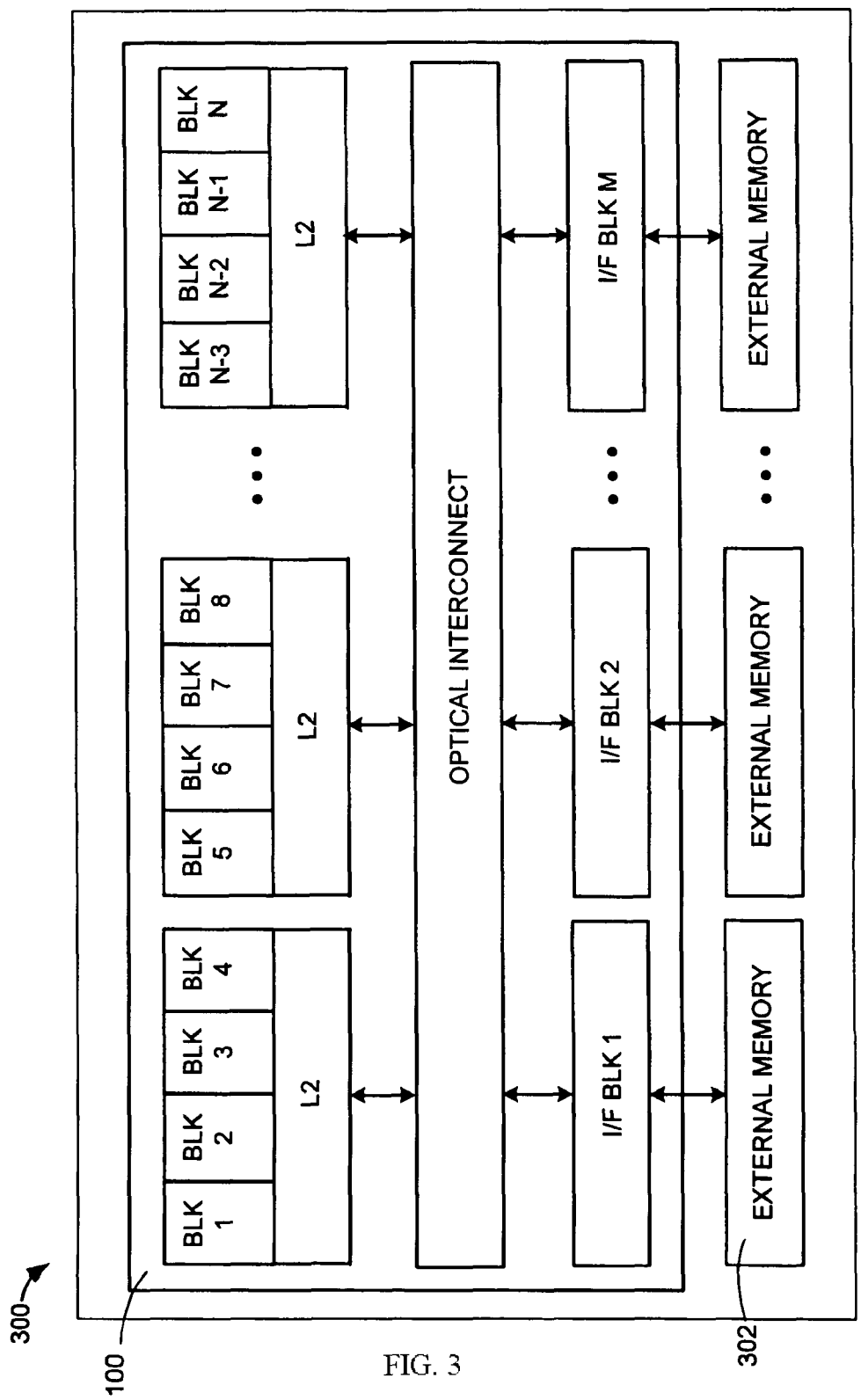
FIG. 3 is a block diagram view of an electronic subsystem with the integrated circuit of FIG. 1.

Referring now to FIG. 3, therein is shown a block diagram view of an electronic subsystem 300 with the integrated circuit 100 of FIG. 1. The block diagram depicts the integrated circuit 100 coupled with external memories 302, such as DRAM, SRAM, ROM, or non-volatile random access memory (NVRAM). The integrated circuit 100 may further connect to a lower memory level (not shown) in the system memory hierarchy, such as a hard disk drive, or an I/O subsystem.

The integrated circuit 100 and the external memories 302 are preferably included in an electronic assembly, such as a printed circuit board. For illustrative purposes, the electronic subsystem 300 is shown with the integrated circuit 100 and the external memories, although it is understood that the electronic subsystem 300 may have different devices. For example, the electronic subsystem 300 may include other interface integrated circuits, display devices, and mechanical devices.

Figures 4A, 4B, 4C:
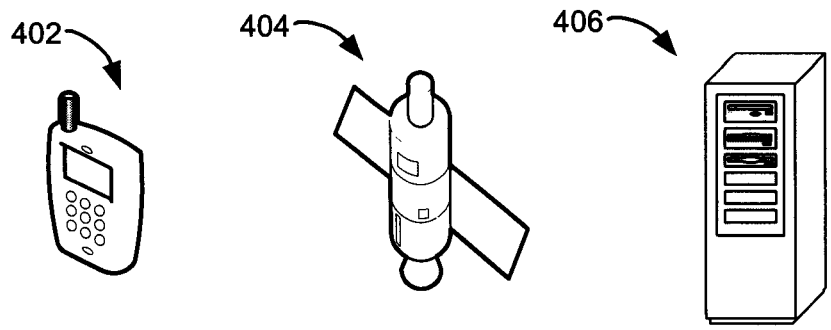
FIGS. 4A, 4B, and 4C are schematic views of examples of electronic systems in which various aspects of the present invention may be implemented.

Referring now to FIGS. 4A, 4B, and 4C, therein are shown schematic views of examples of electronics systems in which various aspects of the present invention may be implemented. A smart phone 402, a satellite 404, and a compute system 406 are examples of the electronic systems using the present invention.

The electronic systems may be any system that performs any function for the creation, transportation, storage, and consumption of information. For example, the smart phone 402 may create information by transmitting voice to the satellite 404. The satellite 404 is used to transport the information to the compute system 406. The compute system 406 may be used to store the information. The smart phone 402 may also consume information sent from the satellite 404.

The electronic systems, such as the smart phone 402, the satellite 404, and the compute system 406, include a one or more of the electronic subsystem 300 of FIG. 3, such as a printed circuit board having the present invention or an electronic assembly having the present invention. The electronic systems may also include the electronic subsystem 300 implemented as an adapter card.

Figure 5:
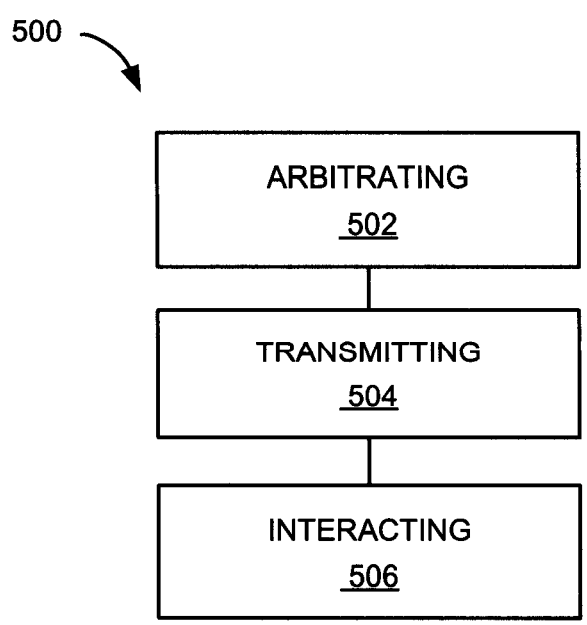
FIG. 5 is a flow chart of a method for operating of the integrated circuit in an embodiment of the present invention.

Referring now to FIG. 5, therein is shown a flow chart of a method 500 for operating of the integrated circuit 100 in an embodiment of the present invention. The method 500 includes arbitrating a communication having a first wavelength over a first optical channel between a first block and a second block in a block 502; transmitting first information with the first wavelength over the first optical channel from the first block in a block 504; and interacting with the first wavelength having the first information with the second block in a block 506.

In one aspect, the present invention provides the communication bandwidth per unit of dissipated power provided by an on-chip optical WDM or DWDM interconnect technology with channel agile modulators exceeding electrical interconnects by a factor of 100-1000. This corresponds to net system-level performance improvements by a factor of 10-100 and enables new programmable architectures to solve new problems with computational and communication bandwidths that approach current supercomputers. By exploiting the ability to move data affordably, wherever it is needed, we can both reduce power and total cost while improving bandwidth, programmability, and performance.

While the invention has been described in conjunction with one or more embodiments, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating an integrated circuit comprising:
   arbitrating a communication having a first wavelength over a first optical channel between a first block and a second block;
   transmitting first information with the first wavelength over the first optical channel from the first block; and
   interacting with the first wavelength having the first information with the second block,
   wherein:
     the interacting with the first wavelength with the second block comprises using at least one fixed-wavelength photodetector of a bank of fixed-wavelength photodetectors.

2. The method as claimed in claim 1 further comprising:
   arbitrating a communication having a second wavelength over a second optical channel between the second block and the first block; and
   transmitting second information with the second wavelength over the second optical channel from the second block to the first block.

3. The method as claimed in claim 1 further comprising:
   monitoring the first optical channel by a third block; and
   subsequent to monitoring the first optical channel with the third block, not performing additional tasks with the first wavelength having the first information with the third block.

4. The method as claimed in claim 1 wherein transmitting the first information with the first wavelength over the first optical channel includes transmitting wavelength division multiplexed light over the first optical channel.

5. An integrated circuit comprising:
   a first optical channel;
   a first block coupled with the first optical channel and having both a first tunable wavelength modulator and a first photodetector;
   a second block coupled with the first optical channel and having both a second tunable wavelength modulator and a second photodetector; and
   an arbitration block coupled to the first optical channel for assigning a communication over the first optical channel between the first block and the second block for the first tunable wavelength modulator to emit a first wavelength and the second photodetector to monitor the first optical channel,
   wherein the first tunable wavelength modulator includes a bank of fixed-wavelength modulators, and
   wherein at least one of the first photodetector and the second photodetector includes a bank of fixed-wavelength photodetectors.

6. The circuit as claimed in claim 5 further comprising a second optical channel for communicating between the second block and the first block with the communication over the second optical channel assigned by the arbitration block.

7. The circuit as claimed in claim 5 wherein the second block having the second photodetector does not respond to a second wavelength over the first optical channel with the second wavelength different from the first wavelength.

8. The circuit as claimed in claim 5 further comprising a third block having a third photodetector coupled to the first optical channel wherein the third photodetector does not respond to the first wavelength.

9. The circuit as claimed in claim 5 wherein the first optical channel is for carrying wavelength division multiplexed light.

10. The circuit as claimed in claim 5 further comprising:
    a second optical channel for communicating between the second block and the first block with the communication over the second optical channel assigned by the arbitration block for the second tunable wavelength modulator to emit a second wavelength and the first photodetector to monitor to the second optical channel; and
    a third block having a third photodetector coupled to the first optical channel wherein the third photodetector does not respond to the first wavelength.

11. The circuit as claimed in claim 10 wherein the first optical channel includes a portion of the first optical channel dedicated for communication to the second block.

12. The circuit as claimed in claim 10 wherein the first optical channel is a waveguide.

13. An integrated circuit comprising:
    a first optical channel;
    a first block coupled with the first optical channel and having both a first tunable wavelength modulator and a first photodetector;
    a second block coupled with the first optical channel and having both a second tunable wavelength modulator and a second photodetector; and
    an arbitration block coupled to the first optical channel for assigning a communication over the first optical channel between the first block and the second block for the first tunable wavelength modulator to emit a first wavelength and the second photodetector to monitor the first optical channel;
    a second optical channel for communicating between the second block and the first block with the communication over the second optical channel assigned by the arbitration block for the second tunable wavelength modulator to emit a second wavelength and the first photodetector to monitor to the second optical channel; and
    a third block having a third photodetector coupled to the first optical channel wherein the third photodetector does not respond to the first wavelength,
    wherein:
    the first tunable wavelength modulator includes a bank of fixed-wavelength modulators; and
    the arbitration block for assigning the communication over the first optical channel selects the first wavelength from the bank of the fixed-wavelength modulators.

14. An integrated circuit comprising:
    a first optical channel;
    a first block coupled with the first optical channel and having both a first tunable wavelength modulator and a first photodetector;
    a second block coupled with the first optical channel and having both a second tunable wavelength modulator and a second photodetector; and
    an arbitration block coupled to the first optical channel for assigning a communication over the first optical channel between the first block and the second block for the first tunable wavelength modulator to emit a first wavelength and the second photodetector to monitor the first optical channel;

a second optical channel for communicating between the second block and the first block with the communication over the second optical channel assigned by the arbitration block for the second tunable wavelength modulator to emit a second wavelength and the first photodetector to monitor to the second optical channel; and a third block having a third photodetector coupled to the first optical channel wherein the third photodetector does not respond to the first wavelength, wherein the second photodetector includes a bank of fixed-wavelength photodetectors.

15. An integrated circuit comprising:

a first optical channel;

a first block coupled with the first optical channel and having both a first wavelength modulator and a first photodetector;

a second block coupled with the first optical channel and having both a second wavelength modulator and a second photodetector; and an arbitration block coupled to the first optical channel for assigning a communication over the first optical channel between the first block and the second block for the first wavelength modulator to emit a first wavelength and the second photodetector to monitor the first optical channel, wherein at least one of the first photodetector and the second photodetector includes a bank of fixed-wavelength photodetectors.

* * * * *